(12) United States Patent
Johnson, Jr.

(10) Patent No.: US 7,093,657 B2
(45) Date of Patent: *Aug. 22, 2006

(54) EARTH LOOP INSTALLED WITH SONIC APPARATUS

(75) Inventor: Howard E. Johnson, Jr., Kennesaw, GA (US)

(73) Assignee: Enlink Geoenergy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/247,997

(22) Filed: Oct. 10, 2005

(65) Prior Publication Data

US 2006/0060353 A1 Mar. 23, 2006

Related U.S. Application Data

(62) Division of application No. 10/613,511, filed on Jul. 3, 2003, now Pat. No. 6,955,219.

(51) Int. Cl.
*E21B 7/24* (2006.01)
*E21B 33/13* (2006.01)

(52) U.S. Cl. .................. 166/286; 165/45; 166/302; 175/56; 175/57

(58) Field of Classification Search .............. 166/286, 166/302, 290, 177.4, 249, 177.6; 175/56, 175/57, 55; 165/45; 62/260
See application file for complete search history.

(56) References Cited

U.S. PATENT DOCUMENTS

| | | | |
|---|---|---|---|
| 3,096,833 A | 7/1963 | Bodine | 175/156 |
| 3,249,162 A | 5/1966 | Brown | 175/96 |
| 3,499,293 A | 3/1970 | Kato | 173/49 |
| 3,734,209 A | 5/1973 | Haisch et al. | 175/171 |
| 3,835,943 A | 9/1974 | Bray | 175/171 |
| 3,878,686 A | 4/1975 | Hageman et al. | 61/36 R |
| 3,979,917 A | 9/1976 | Crafton | 61/42 |
| 4,006,665 A | 2/1977 | Klemm | 91/278 |
| 4,023,628 A | 5/1977 | Bodine | |
| 4,073,353 A | 2/1978 | Bodine | |
| 4,100,983 A | 7/1978 | Herrmann et al. | 175/383 |
| 4,393,932 A | 7/1983 | Bodine | 166/249 |
| 4,403,665 A | 9/1983 | Bodine | |
| 4,512,401 A | 4/1985 | Bodine | 166/249 |
| 4,574,875 A | 3/1986 | Rawlings et al. | 165/45 |
| 4,595,059 A | 6/1986 | Katagiri et al. | 175/171 |

(Continued)

FOREIGN PATENT DOCUMENTS

DE    3114262    11/1982

OTHER PUBLICATIONS

PCT/GB2004/002552; Int'l Search Report, 4 pp.; and PCT Written Opinion, 6 pp.

(Continued)

*Primary Examiner*—Hoang Dang
(74) *Attorney, Agent, or Firm*—Guy McClung (57) ABSTRACT

A method for installing a heat exchange pipe loop in a borehole, the method, in at least certain aspects, including drilling a borehole with a sonic drill system having a head and casing connected thereto, a drill apparatus on a lower end of the casing movable by the sonic drill head to drill the borehole, pumping fluid into the casing and up to earth surface in an annular space in the borehole so that drilled material flows to the earth surface, lowering a heat exchange pipe loop having a lowermost U/bend member down into the casing, introducing grout into the casing around the heat exchange pipe loop, and extracting the casing from the borehole.

23 Claims, 5 Drawing Sheets

U.S. PATENT DOCUMENTS

| | | | |
|---|---|---|---|
| 4,615,400 A | 10/1986 | Bodine | 175/55 |
| 4,662,459 A | 5/1987 | Bodine | |
| 4,693,325 A | 9/1987 | Bodine | |
| 4,719,978 A | 1/1988 | Klemm | 175/113 |
| 4,736,794 A | 4/1988 | Bodine | 166/286 |
| 4,840,238 A | 6/1989 | Klemm | 175/92 |
| 4,905,777 A | 3/1990 | Spies | 175/73 |
| 4,909,323 A | 3/1990 | Hastings | 166/242 |
| 4,912,941 A | 4/1990 | Buchi | 62/260 |
| 4,981,396 A | 1/1991 | Albertson et al. | 405/178 |
| 5,152,342 A | 10/1992 | Rankin et al. | 166/286 |
| 5,205,366 A | 4/1993 | Klemm | 175/390 |
| 5,255,590 A | 10/1993 | Klemm | 91/516 |
| 5,263,545 A | 11/1993 | Tudora et al. | 175/171 |
| 5,269,107 A | 12/1993 | Klemm | 52/115 |
| 5,291,956 A | 3/1994 | Mueller et al. | 175/67 |
| 5,350,023 A | 9/1994 | Klemm | 173/17 |
| 5,411,085 A | 5/1995 | Moore et al. | 166/242 |
| 5,417,290 A | 5/1995 | Barrow | |
| 5,419,403 A | 5/1995 | Klemm | 173/115 |
| 5,435,387 A | 7/1995 | Roberts | 166/242 |
| 5,435,395 A | 7/1995 | Connell | 166/384 |
| 5,477,914 A | 12/1995 | Rawlings | 165/45 |
| 5,501,287 A | 3/1996 | Loeser | 175/173 |
| 5,549,170 A | 8/1996 | Barrow | |
| 5,562,169 A | 10/1996 | Barrow | 175/56 |
| 5,590,715 A | 1/1997 | Amerman | 166/290 |
| 5,634,515 A | 6/1997 | Lambert | 165/45 |
| 5,639,184 A | 6/1997 | DeMasters | 405/156 |
| 5,752,572 A | 5/1998 | Baiden et al. | 175/26 |
| 5,765,643 A | 6/1998 | Shaaban et al. | 166/384 |
| 5,803,187 A | 9/1998 | Javins | 175/415 |
| 5,812,068 A | 9/1998 | Wisler et al. | |
| 6,000,459 A | 12/1999 | Jeppesen | 165/45 |
| 6,041,862 A | 3/2000 | Amerman | 166/290 |
| 6,164,391 A | 12/2000 | Wurm | 175/52 |
| 6,244,360 B1 | 6/2001 | Steinsland | 175/52 |
| 6,250,371 B1 | 6/2001 | Amerman et al. | 165/45 |
| 6,251,179 B1 | 6/2001 | Allan | 106/719 |
| 6,276,438 B1 | 8/2001 | Amerman et al. | 165/45 |
| 6,502,636 B1 | 1/2003 | Chatterji et al. | 166/293 |
| 6,588,509 B1 | 7/2003 | Allyn et al. | 166/340 |
| 6,739,410 B1 | 5/2004 | Smith et al. | 175/55 |
| 6,955,219 B1 * | 10/2005 | Johnson, Jr. | 166/286 |
| 6,968,910 B1 | 11/2005 | Bar Cohen et al. | 175/56 |
| 2003/0010652 A1 | 1/2003 | Hunt | 205/742 |
| 2003/0221870 A1 | 12/2003 | Johnson | 175/71 |
| 2004/0007387 A1 | 1/2004 | Bar Cohen et al. | 175/50 |
| 2004/0113340 A1 | 6/2004 | Lange et al. | 267/162 |

OTHER PUBLICATIONS

New Rigs and Accessories. Water Well Journal. vol. 1. No. 10. Oct. 1996: pp. 33-37.

Casing Drilling Making Major Strides. The American Oil & Gas Reporter. Apr. 2002. pp. 87-89. 91. HRB 605 Me Hutte & Co., May 2000.

Hydraulic Hammer HB 60A. Krupp Berco Bautechnik. Oct. 2000. present throughout the world. Hutte & CO.. May 2000.

* cited by examiner

EARTH LOOP INSTALLED WITH SONIC APPARATUS

RELATED APPLICATION

This is a division of U.S. application Ser. No. 10/613,511 filed 3 Jul. 2003, issued as U.S. Pat. No. 6,955,219 on 18 Oct. 2005, which application and patent are incorporated fully herein for all purposes and from all of which the present invention claims priority under the Patent Laws.

BACKGROUND OF THE INVENTION

1. Field of the Invention

The present invention is directed to underground heat exchange systems; to apparatus and methods for drilling wellbores for such systems using sonic drilling systems; and to installing underground heat exchange systems.

2. Description of Related Art

The prior art discloses a wide variety of systems for circulating water or refrigerant through pipes in the earth with)the earth serving as a heat sink or heat source heat transfer between the fluid in the pipes and the earth. The prior art discloses numerous in-ground heat exchanger systems; and grouting systems (see, e.g. U.S. Pat. Nos. 5,435,387; 5,244,037; 5,261,251; 5,590,715; 5,758,724; 6,250,371; 6,041,862; and 6,276,438; and pending U.S. application Ser. No. 10/387,125 filed Mar. 12, 2003; and the references cited in these patents and application)—all of which patents, applications therefor, references and application are incorporated here fully for all purposes.

Often the energy efficiency of a geothermal heat pump system is far superior to traditional HVAC alternatives of air source heat pumps, boilers, chillers, furnaces, cooling towers, etc., in many cases requiring fifty percent less energy to operate. One reason why this energy efficient GHP heating/cooling technology is not more widely used is that the initial installed cost is usually higher than for traditional HVAC systems. Often fifty percent or more of the initial cost of a geothermal heat pump system is for constructing an earth loop heat exchanger. Thus it is desirable that the cost of this heat exchanger be kept to a minimum. However, when geological conditions are unusually difficult, drilling and completion costs can dramatically increase, and the cost of installing a geothermal heat pump system can become prohibitive. Thus there is a need, recognized by the present inventor, for a method for the economical construction of a earth heat exchanger which would make possible the widespread use of this energy efficient and environmentally friendly geothermal heat pump technology.

With many prior art systems, the construction of an earth loop heat exchanger has included drilling a borehole 150 to 500 feet deep, inserting a small diameter (usually 0.75 inch to 1.25 inch diameter) polyethylene pipe loop, and grouting the loop in place. Trenches are then dug between such multiple boreholes and earth loop ends are manifolded together in parallel, connected to a common header, and then connected to heat pumps. Water is then circulated through this closed loop system, and heat is absorbed from or transferred to the earth, as the heat pumps require. If so called "direct exchange" heat pump technology is utilized, often copper refrigerant lines are placed in direct contact with the earth, and the heat exchange is accomplished directly with the earth instead of through a secondary water-to-refrigerant heat exchange. Both the more widely used "water source" heat pump technology systems and the direct exchange heat pump technology are available. Both systems are similar insofar as the drilling and completion problems with the earth heat exchangers are concerned.

One typical earth loop heat exchanger design for a small school might require the drilling of 100 holes to a depth of 300 feet, while a large school might require 1000 such holes. High drilling rates and consistent production is preferred for keeping down the costs of the earth heat exchanger. One type of drilling arrangement used to build a geothermal heat exchanger system provides a large number of holes that are relatively deep. Rapid mobilization and set-up between closely spaced holes, fast drilling rates of penetration, and hole stability are critical. However, the drilling technology used in other drilling disciplines is not well-suited or optimized for such geothermal applications. For example, quarry drilling, seismic drilling, and construction drilling all require large numbers of holes in a relatively compact geographic area, but the holes required are relatively shallow in depth, often less than 100 feet deep. In water well drilling and geotechnical investigation drilling, the holes are drilled deeper, but they are relatively small in number. With ancillary operations such as sampling, logging, setting pumps, installing controls and monitoring devices, etc., the speed at which water wells or environmental wells are drilled becomes less critical than it is on geothermal projects.

In addition, many drill rigs are usually designed to drill optimally in only one specific type of formation. Unconsolidated formations such as sand/clay/gravel formations are usually drilled best using mud rotary techniques. The mud rotary drill system utilizes a mud mixing/circulation system incorporating duplex or triplex mud pumps. The drilling mud circulation system transports the drilled spoils out of the hole and also serves to help keep the drilled hole from collapsing. If hard or rock conditions are encountered, drilling progress slows down significantly. If extremely unstable soil conditions are encountered, the mud weight must be regulated carefully to prevent hole collapse and/or to prevent "mining" or over-excavation from occurring.

Constant mud regulation can slow drilling progress significantly. The production rate in mud rotary applications can vary widely and is affected by the formation geology and by the expertise of the driller. The driller is required to know when to thicken up, thin out, or weight up drilling mud; which drill bit to select; what rotation speed to use; how much circulation time is adequate; what additives to put in the mud; and how much pull-down force to apply, etc. These variables can change significantly as the lithology through which drilling is being done changes with increasing depth. In addition, mud drilling can significantly increase the thermal resistance of the borehole in the near-wellbore area by building a wall-cake of poorly thermally conductive bentonite drilling mud—thus requiring additional holes to be drilled.

At another extreme, hard formations such as limestone, sandstone, granite, etc. are usually drilled most economically with downhole hammers powered by compressed air. Even where drilling conditions are predominantly rock, there is usually a layer of unconsolidated overburden on top of the rock which must be penetrated and stabilized before the downhole hammers can effectively begin to drill the rock. If the overburden is very soft or unstable, the top portion of the hole must be supported with casing pipe, usually steel, at least for a depth down to the rock. If the overburden is not stabilized, the top portion of the hole will erode or be "mined out" as the rock is drilled, in extreme cases causing the drill rig to capsize. The expense of traditional overburden drilling and stabilization has made many geothermal projects' cost prohibitive.

Often it is only necessary to case a geothermal borehole temporarily. Once the heat exchanger pipe has been inserted and grouted in place, the casing can be removed. Not only is permanent casing expensive, it can also inhibit the thermal transfer of heat between the heat exchanger pipe and the earth. Even where carousels or magazines automatically handle drill pipe, any casing is often handled manually—using slings, ropes, and cables. In many casing operations, the casing pipe sections are welded together while tripping into the hole and cut apart with a torch as they are extracted from the hole. Besides being a physically demanding job requiring additional labor, the process of loading heavy and clumsy casing pipe is dangerous to personnel. The logistics of handling the casing pipe at the surface usually dictate the use of additional surface equipment such as forklifts, cranes, boom trucks, etc., thus incurring additional equipment rental and labor costs.

It is widely known to drillers skilled in the art that stabilizing a borehole by using steel or other casing is a good and reliable way to ensure borehole integrity. But it is also just as commonly acknowledged that steel casing is usually the most expensive method of stabilizing a borehole, and, because of its high cost, casing is used only as method of last resort. One standard practice of installing casing is to drill a borehole by conventional means, and then insert the casing in the pre-drilled hole. This method presumes that the hole will stand up long enough to insert the casing to the desired depth. However, if the geology is very unstable, which is the primary reason casing is being inserted in the first place, the pre-drilled hole can collapse before casing insertion can be completed. To compensate for this condition, many drilling procedures and special tools have been developed. One of the well-known concepts is simultaneous drilling while casing, in which the casing is advanced as the hole is being drilled. In some prior art systems two sets of tubulars of different diameters, i.e. drill pipe and casing pipe, are simultaneously advanced one inside the other. Often, two independent rotary drillhead mechanisms are employed, each rotating the casing and drill pipe in opposite directions, and each rotary head capable of independent longitudinal travel along a common drill mast. It can be a complex task to effectively insert drill pipe inside casing, present them to two separate drill heads, clamp the different size diameters of pipe while making up and/or breaking out the threaded connections, rotate the pipe and casing in opposite directions while moving them up and down independently. The process is inherently expensive because the machine is very complicated and additional labor and equipment is required to handle the pipe and casing. Drilling production, while reliable, predictable, and fast when compared to first drilling a hole and then setting the casing afterward, is still relatively slow compared to drilling without casing.

Another prior art method of setting casing utilizes a casing hammer to hammer the casing into the ground. Once the casing is hammered in place, the earth inside the casing is drilled out. However, due to the rapid build-up of skin friction between the earth and the casing, the physical limitations of the casing, and the high power required by the hammer, casing driving is slow, and often can only be accomplished to fairly shallow depths. The casing also frequently becomes stuck and/or damaged.

Although sonic drilling principles have been well known for many years, application of these principles has been largely dedicated to specialized areas of geotechnical investigation, mineral sampling, environmental sampling, and monitoring well construction. In these types of drilling, relatively undisturbed core samples of earth are captured inside the casing and recovered for analysis as the drilling progresses. Since the primary emphasis in these types of drilling is on gathering quality soil samples, speed is not essential, and the potential for using sonic drilling for relatively high-speed geothermal borehole production has not been previously considered. In addition, the sonic drillhead and tooling used in sonic drilling can be substantially more expensive than traditional mud rotary or air drilling equipment; and, since geothermal drilling has been normally considered to be very "cheap" drilling work, the investment in "high technology" sonic equipment to drill boreholes has often been discounted as economically prohibitive.

SUMMARY OF THE PRESENT INVENTION

The present invention provides, in certain aspects, a method for the efficient construction of a earth heat exchange system and, in one particular aspect, such a system for use with a ground source heat pump heating/refrigeration system (commonly referred to as a geothermal heat pump or "GHP" system). In one aspect such a heat exchange system is installed using a sonic drilling and casing machine to efficiently drill and stabilize earth boreholes until the heat transfer loop(s) can be inserted into the drilled hole and grouted in place. After installation of the heat transfer loop(s) and grouting is completed, the drilling machine extracts the temporary casing from the borehole, leaving the grouted heat transfer loop(s) in place. The recovered casing can then be used on subsequent boreholes.

Many problems and the related expense associated with drilling in difficult or unstable geological conditions using traditional mud rotary or air drilling techniques are significantly mitigated or eliminated with systems according to the present invention—thereby increasing drilling rates and efficiency, loop insertion rates and efficiency, and grouting productivity. Consequently, earth loop heat exchanger construction costs are reduced, thus making energy-saving geothermal heat pump technology more competitive on a "first cost" basis as compared to traditional air conditioning or refrigeration alternatives.

The present invention, in at least certain aspects, provides a method for installing a heat exchange pipe loop in a borehole, the method including drilling a borehole down into earth using a sonic drill head, the sonic drill head having casing connected thereto, a drill shoe connected to a lower end of the casing so that movement (oscillation, stroking up and down, and/or oscillation and rotation) of the casing by the sonic drill head drills the borehole down into the earth, pumping a mixture of water and drilling fluid down into the casing during drilling, out through a lower end of the casing, and up to earth surface in an annular space between an interior surface of the borehole and an exterior surface of the casing so that drilled material flows from the borehole to the earth surface, lowering a heat exchange pipe loop down into the casing, introducing grout into the casing around the heat exchange pipe loop, the grout displacing an amount of the mixture of water and drilling fluid from within the casing, and extracting the casing from the borehole.

It is, therefore, an object of at least certain preferred embodiments of the present invention to provide:

New, useful, unique, efficient, non-obvious earth loop heat exchange systems;

New, useful, unique, efficient, non-obvious earth loop heat exchange systems wherein an earth loop is installed using a sonic drilling system; and Such systems and methods which produce a grouted in-place earth loop which, in one aspect, has significantly de-aerated densified grout;

Such systems and methods in which the amount of drilled material coming to the surface is significantly reduced or eliminated.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

The Abstract that is part hereof is to enable the U.S. Patent and Trademark Office and the public generally, and scientists, engineers, researchers, and practitioners in the art who are not familiar with patent terms or legal terms of phraseology to determine quickly from a cursory inspection or review the nature and general area of the disclosure of this invention. The Abstract is neither intended to define the invention, which is done by the claims, nor is it intended to be limiting of the scope of the invention in any way.

It will be understood that the various embodiments of the present invention may include one, some, or all of the disclosed, described, and/or enumerated improvements and/or technical advantages and/or elements in claims to this invention.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or equivalent embodiments.

DESCRIPTION OF EMBODIMENTS PREFERRED AT THE TIME OF FILING FOR THIS PATENT

In one embodiment, a system according to the present invention includes steps of: drilling; earth loop insertion; grouting; and casing recovery. In one particular drilling method according to the present invention a steel cased borehole 5 inches in diameter 350 feet deep in an unconsolidated formation (e.g., but not limited to, sandy clay) is drilled in 20 minutes if no unexpected drilling conditions are encountered. In one aspect the drilling rig is a crawler-mounted or truck-mounted machine. In one aspect only a single operator is required to perform the complete drilling and casing function.

In one embodiment a drilling machine according to the present invention has a sonic rotary drill head; an on-board carousel or magazine for both drill pipe and casing; an onboard water pump; an onboard air compressor; a drill mast to which is movably connected a sonic drilling head; movement apparatus for moving the sonic drilling head up and down (and casing connected thereto); and, optionally, a pump system for pumping drilling fluid and/or additives. In one preferred embodiment, the sonic drill head has: an oscillation frequency of 30 to 150 hertz, a rotating speed of 0 to 150 rpm, and a torque of 7,500 lbs-ft., such as the 50K (TM) system made by Sonic Drill Corporation of Vancouver, B.C.; an on-board carousel or magazine with an automatic drill rod/casing handling mechanism; an onboard water pump that is a positive displacement type capable of pressures in excess of 1100 psi at flow rates of 90 gpm (like a Weatherford 2075 pump); an onboard air compressor for delivering air at 500 psi at 900 scfm, e.g. a Sullaire 900XHHDL (TM) system; and a small metering pump for pumping a drilling fluid and/or additives, e.g., but not limited to, polyacrylamide drilling gel, xanthum gum, guar gum, natural fluids, and/or synthetic drilling polymers.

Figure 1A:
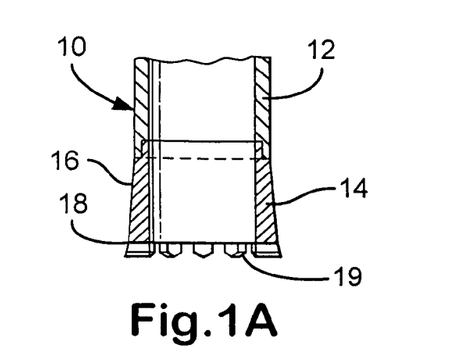
FIG. 1A is a side cross-section view (along line 1A—1A of FIG. 1B) of a drilling apparatus useful in methods according to the present invention.
Figure 1B:
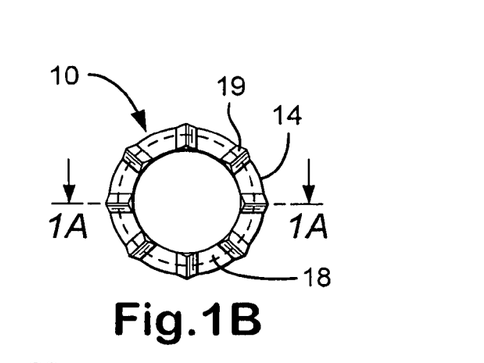
FIG. 1B is a bottom view of the drilling apparatus of FIG. 1A.

In one method according to the present invention, in relatively soft formation drilling, casing pipe is fitted with an open drilling shoe as illustrated in FIG. 1. As the casing pipe is rotated and oscillated by the sonic drillhead, water containing approximately 0.5 to 1% polyacrylamide drilling gel, (e.g., but not limited to, E-Z MUD (TM) provided by Baroid Corporation), or other synthetic or natural drilling material or polymer is pumped down the casing. Oscillating action of the sonic drillhead vibrates the casing (which may be a string of individual pieces of casing joined together) e.g., but not limited to, to resonance thereby liquefying the material in the near-wellbore zone extending from the drilling shoe open end and along the length of the casing within the hole.

Pumped water/gel mixture is pumped, in one preferred embodiment, at such a volume that it displaces a volume of material slightly greater than the combined volume of the casing and the interior volume of the casing, thus allowing the casing string to be advanced into the earth. As the casing is vibrated and water containing drilling additive(s) (e.g., drilling gel) is pumped downhole through the hollow casing and out of the end of the drilling shoe, material adjacent to the casing and material directly in front of the casing shoe is liquefied and displaced into the existing formation or forced to flow towards the surface in the annular space between the casing pipe and the earth as the entire drill string is advanced into the earth. In one aspect, the volume of fluid pumped downhole is slightly greater than the volume of earth displaced by the casing as it is advanced into the earth. By maintaining the drill fluid pumping rate at a slightly greater rate than the casing advancement rate, the end of the open casing remains unobstructed by the earth material being displaced. Additional casing pipes are then added sequentially and the operation continues until the desired depth is reached. The result is a steel-cased borehole, open and unobstructed at the bottom end.

In certain aspects, the present invention results in fewer drilled cuttings or "spoils" being returned to the surface as compared to the amount of such cuttings produced with traditional mud rotary drilling. In mud rotary drilling, circulation is maintained in the annular space between the drill pipe and the native earth wall. The primary purpose for this mud circulation is to transport the cuttings produced by the drill bit to the surface. If circulation is lost to the formation, unstable portions of the borehole wall can collapse and pack around the drill pipe, thus trapping the drill assembly in the hole. Since the drill bit is usually much larger in diameter than the drill pipe, extraction of the drill pipe from the hole is often a difficult and expensive consequence. Frequently, entire strings of drill pipe are permanently lost. At the very least, productivity is negatively affected. If drilling proceeds as planned and circulation is maintained, large quantities of drilled cuttings are produced at the surface. In many formations a resulting borehole can "wash out," resulting in a much larger hole than desired with a diameter significantly larger than the diameter of the bit being used. This can increase spoils handling costs; increase grout costs; and decrease overall productivity. In some instances, project requirements, local, or federal ordinances may require that the drill spoils to be removed from the jobsite, resulting in high material handling and transportation costs. Often, the drill spoils must be disposed of as hazardous or even toxic waste, escalating project costs even further. Since hundreds of holes are often drilled at the same site on a geothermal project, these disposal costs are very significant.

Often unconsolidated geological formations contain space between formation constituents, e.g. from 25% to 45% interstitial space between the solid particles of the formation. There are also naturally occurring seams, voids, caverns, cracks, crevices, etc., which are responsible for undesirable "lost circulation" described above. During sonic drilling, the resonating oscillations along the full-length casing string liquefy the drill spoils and compact them into the interstitular space throughout the near wellbore area and into any seams or lost circulation zones. Unless the formation is very tight and has no void space, very few if any cuttings are produced at the surface. Since the casing oscillates and rotates, and since the casing string has no large bit on the end, there is a significantly reduced possibility that the drill string will become stuck if circulation back to the surface is lost. Therefore, the cost of dealing with drill spoil returns is greatly reduced or eliminated, and the jobsite also remains much cleaner and drier.

Regardless of the stability of the native soils, the steel casing pipe enhances the integrity of the borehole. If a consolidated formation like limestone or granite is encountered, it may be economically desirable to terminate the sonic casing installation once the unconsolidated overburden has been stabilized with casing. Then, according to one aspect of the present invention, a downhole hammer system and smaller drill pipe are attached to the sonic drillhead, and the remaining borehole depth is finished by compressed air drilling through the casing. Alternatively, a typical solid drill bit and associated apparatus and equipment is used.

Following creation of the borehole with the casing in place therein, a polyethylene heat exchange pipe loop, which has been previously filled with water, pressurized, and sealed, is lowered into the cased borehole. Then a thermally conductive grout mixture is poured or pumped into the cased borehole to fill the annulus between the heat exchanger pipe and the casing, displacing the water/gel mixture inside the casing. In one aspect, the grout includes suitable additives to retard the set of the grout and to maintain the grout in a fluid state until the temporary casing can be extracted. For example, in certain aspects cement setting retardant materials, such as, but not limited to, sodium or calcium lignosulfonate, are added in an amount sufficient to give 1 to 24 hours of set delay. A long chain polysaccharide xanthan gum additive, e.g., "DuoVis." may be added in a quantity ranging from 0.0001 to 0.0020 parts by dry weight to reduce pumping friction. Bentonite clay (sodium montmorillinite) in an amount from 6 percent to 20 percent of the weight of the water or 1 to 5 percent of the weight of the dry grout components may be added to increase plasticity for fluid loss control (to control loss of fluid from the mixture during pumping which could result in sand bridging in the mixture and plugging of a tremmie pipe).

Then, as the sonic drilling head oscillates the casing, the casing is extracted from the borehole by retracting the sonic drillhead on the drill mast and thereby removing the casing from the borehole. The sonic action liquefies the grout and this inhibits "bridging" of the grout, leaving the earth loop heat exchanger pipe and grout in place. Without the sonic action, the grout can tend to pack off around the earth loop and cause the earth loop and grout to be extracted with the casing instead of remaining down within the borehole. The sonic action reduces skin friction between the casing wall and the earth, thus reducing the tendency of the casing to become stuck in the earth. Often this tendency of casing to become stuck in the earth is a reason that the use of casing is a last resort. Using the sonic drilling apparatus produces a better grouting job, reduces grout bridging, and facilitates the extraction of casing while the earth loop and the grout remain in place in the borehole. However, as the casing is removed, the level of the fluid grout in the bore will drop, since the casing that has been removed no longer displaces it. Consequently, additional grout can be added as desired at certain intervals during the casing extraction procedure to ensure that the grout is completely surrounding the heat exchange pipe. This also impedes collapsing of the earth around the heat exchange pipe. The fluid grout flows around the heat exchange pipe as the temporary casing pipe is extracted, thus encapsulating and thermally coupling the heat exchanger pipe to the earth formation.

FIGS. 1A and 1B show a drilling apparatus 10 for use in methods according to the present invention which includes a piece of a tubular 12 (e.g. a piece of drill pipe or casing) interconnected with a string of tubulars (casing or drill pipe) connected to a sonic drillhead (not shown in FIG. 1A) of a sonic drilling system. A tubular 14 with a body 16 having a substantial portion with an outer diameter greater than that of the tubular 12 has a lower portion 18 with a plurality of spaced-apart drilling teeth 19.

It is within the scope of this invention for the teeth 19 to be deleted and/or for the tubular combination 12, 14 to be a single integral piece. It is within the scope of this invention using the teeth 19 (or deleting them) to hardface or provide with a layer of tungsten carbide the lower end of the body 16 and/or the interior of the lower end of the body 16. Optionally, the tubular 14 can be releasably connected to the tubular 12 so that it can be abandoned downhole; or, with a suitably configured tubular 14 so that it can be retrieved while the tubular 12 and the casing string remain in place. Optionally any known solid, fullface drill bit and associated apparatus may be used. Such a bit is, in one aspect, modified with one or more holes through a lower face thereof to permit fluid flow through the bit. Optionally, any suitable known casing shoe may be used for the tubular 14.

Figure 2:
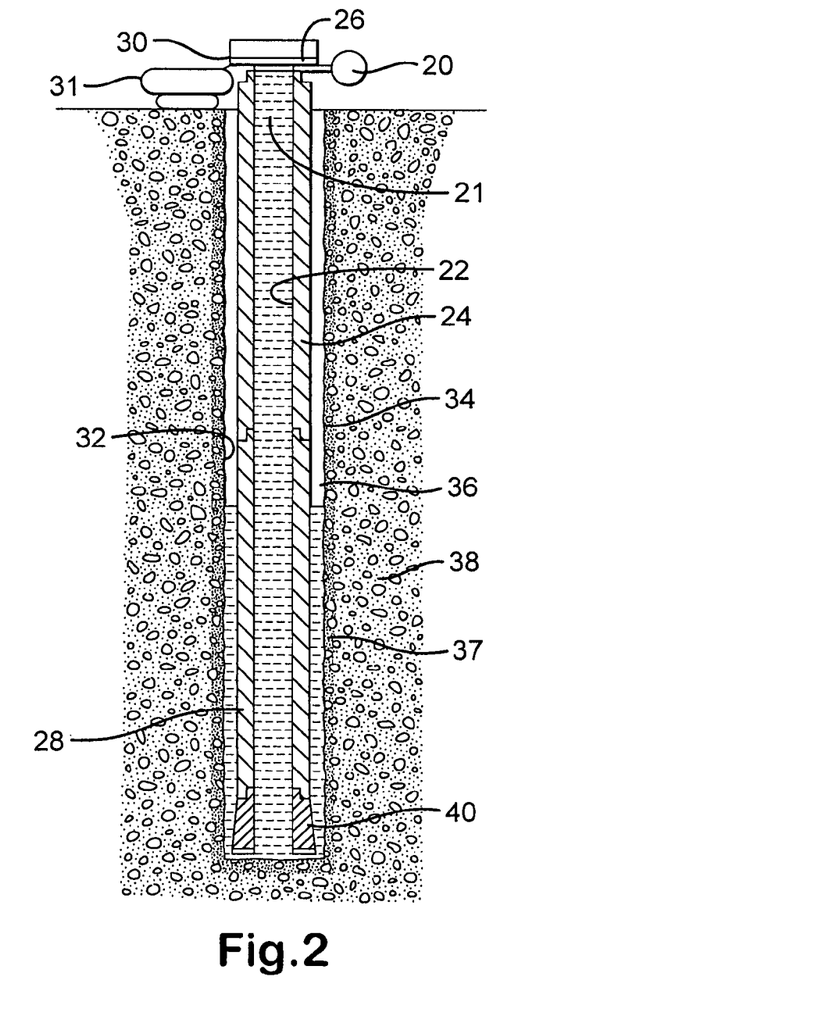
FIG. 2 is a schematic cross-section view showing steps in methods according to the present invention.

As shown in FIG. 2, a method according to the present invention includes pumping water 21 (e.g. but not limited to at a rate of 90 gallons per minute at 1100 psi) with a pump system 20 down into the interior 22 of a casing string 24 connected to a sonic drillhead 26 of a sonic drilling system 30 (optionally movable on a mover 31, e.g., a truck or crawler). A drilling apparatus 40 (like that of FIG. 1A) is connected to a lowermost piece 28 of casing of the casing string 24.

The pumping system 20 provides a constant positive flow of water into the casing string 24 which, in one aspect, extends down at least to the level of the lowermost part of the drilling apparatus 40 so that drilled material is prevented from backing up into the drilling apparatus 40 and into the casing string 24.

As the sonic drilling system moves and oscillates the casing string 24 and the drilling apparatus 40, fluid moves out from the drilling apparatus 40 and up into an annulus 36 between the exterior of the casing string 24 and an interior wall 32 of a wellbore 34. Friction is reduced between the exterior of the drilling apparatus 40 and the interior wall 32 of the bore 34 being drilled and friction is reduced between the exterior of the casing string 24 and interior wall 32.

Drilled material, which includes drilled material that is liquified by the sonic drilling action, moves upwardly in the annulus 36 and, in a suitable earth formation 38 moves into interstitial spaces in the earth formation 38. At least some of this material 37 is consolidated at the edges of the wellbore 34. In certain aspects most, or even substantially all, of drilled material enters the formation and none, or relatively little, drilled material comes to the surface with water, etc. Fling upwardly in the annulus 36.

Figure 3:
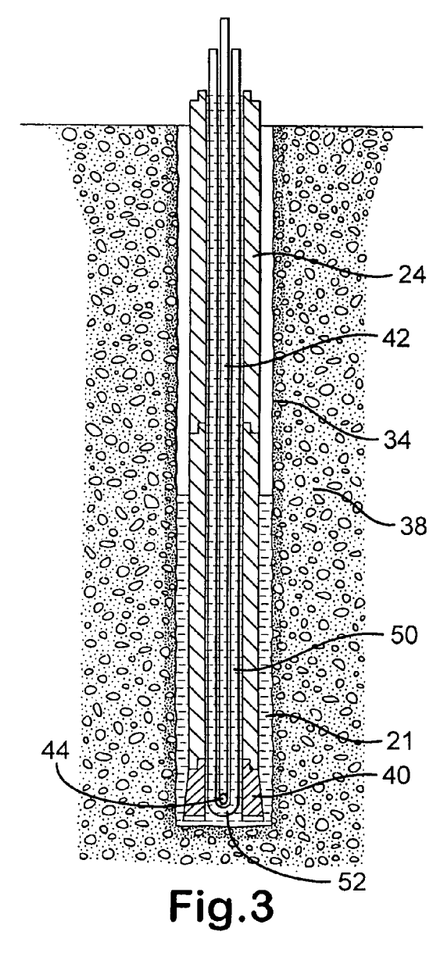
FIG. 3 is a schematic cross-section view showing steps in methods according to the present invention.

As shown in FIG. 3, an earth loop 50 has been pushed into the wellbore 34 with a tremmie pipe 42 (installed, e.g., using a coiled tubing unit). The tremmie pipe 42 has a bottom opening 44 through which grout is pumped optionally, a lowermost U-bend member 52 (e.g., in at least certain embodiments as described in various patents and applications referred to above and incorporated herein by reference or as any known U-bend member) is used at the bottom of the earth loop 50. In one particular aspect the tremmie pipe 42 is made of polyethylene, but it is within the scope of the present invention to make it from any suitable material, including, but not limited to, fiberglass, plastic, metal, metal alloys, composites and/or a combination of any of these.

As shown the wellbore 34 has been drilled down to a desired depth by the sonic drilling system.

Figure 4:
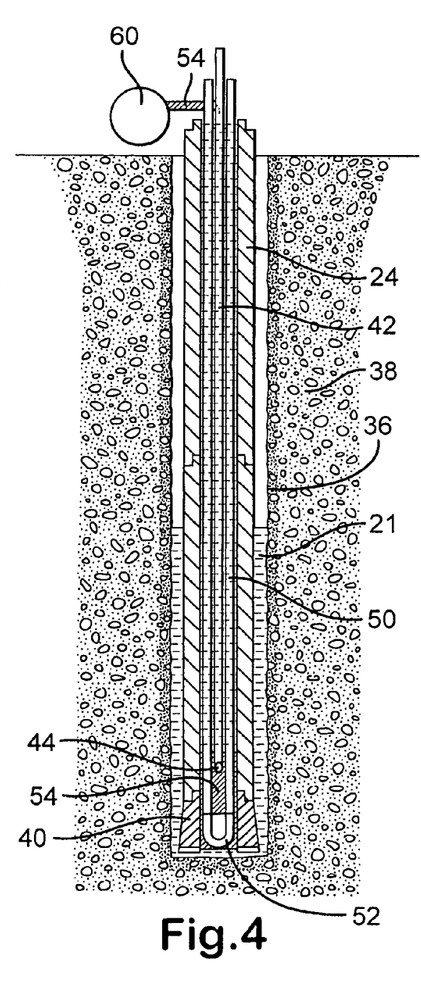
FIG. 4 is a schematic cross-section view showing steps in methods according to the present invention.

FIG. 4 illustrates the beginning of a grouting operation according to the present invention in which grout 54 is pumped with a grout pumping system 60. Grout 54 flows out from the opening 44, around the U-bend 52, and begins to rise within the interior 21 of the casing string 24 and the interior of the drilling apparatus 40.

It is also possible for some grout to exit below the drilling apparatus 40 and rise in the annular space 36. As shown, as the tremmie pipe is released from the earth loop 50 and grout pumping commences, the tremmie pipe 42 is raised within the casing string 24 (e.g., by a coiled tubing unit). Also, as grout is pumped in, water 21 in the casing is displaced and flows out from the top of the wellbore 24 for recovery or disposal thereof.

Figure 5:
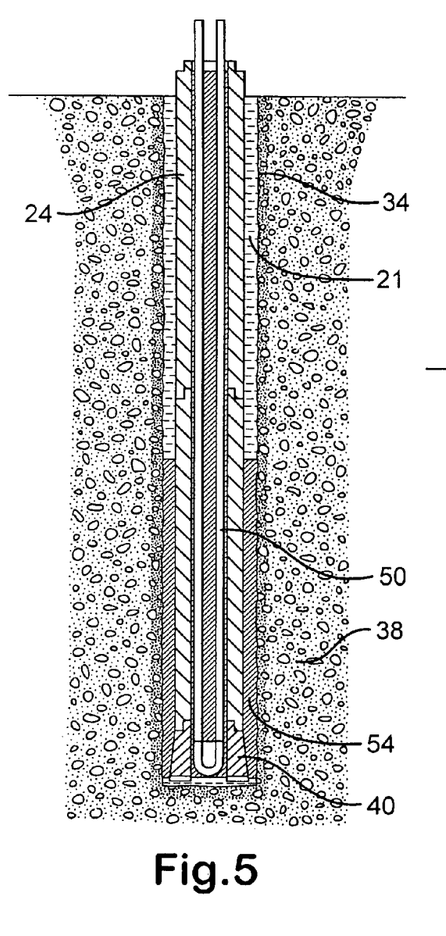
FIG. 5 is a schematic cross-section view showing steps in methods according to the present invention.

As shown in FIG. 5 some of the grout 54 that has moved up in the annular spaced 36 has moved into the formation 38. As shown in FIGS. 4 and 5, the casing string 24 remains in place during the grouting operation; but it is within the scope of the present invention to remove the casing string 24 and the drilling apparatus 40 and then commence a grouting operation. In certain aspects this is advantageous when the earth formation is cemented sands or high in clay content or exhibits high stability properties and the risk of wellbore collapse is minimal. In one particular aspect the wellbore 34 has a diameter of about 5" and the drilling apparatus 40 has an outer diameter of about 4½" as its widest part.

Figure 6:
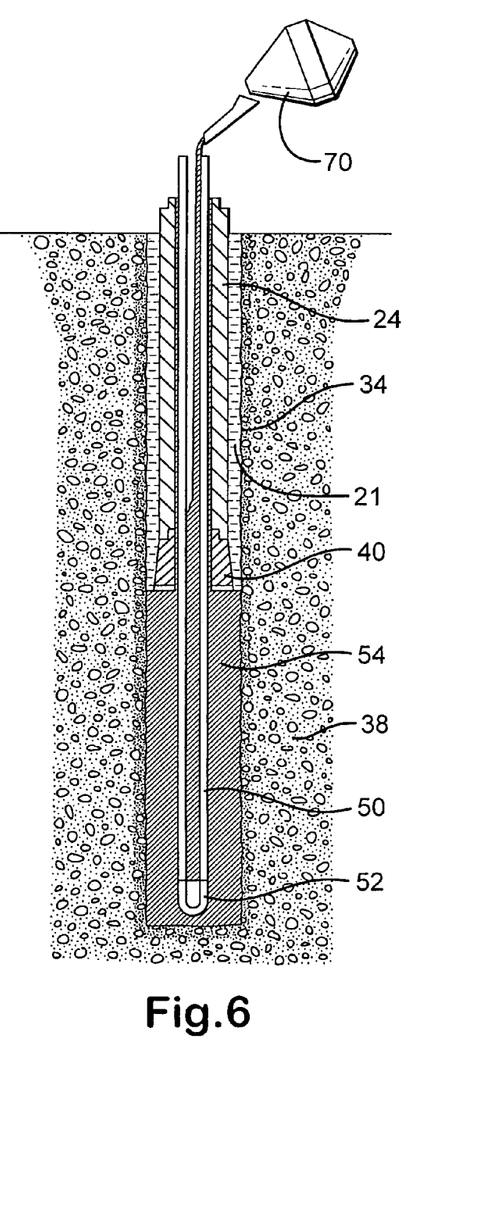
FIG. 6 is a schematic cross-section view showing steps in methods according to the present invention.

FIG. 6 illustrates extraction of the casing string 24 and drilling apparatus 40 from the wellbore 34. Grout 54 is either pumped by a grout pumping system (not shown) or poured with a pouring system 70 into the interior of the casing string 24 as it is extracted with movement apparatus of the sonic drilling system. Grout 54 moving into the wellbore 34 around the earth loop 50 displaces the water 21 upwardly and out from the borehole 34, thus minimizing (or preventing) the influx of undesirable air into the grout 54. In certain aspects some of the grout flows into the formation 38.

The casing string 24, in certain aspects, continues to be vibrated by the sonic drillhead—as it is pulled out from the wellbore 34. This inhibits undesirable bridging of the grout; de-aerates the grout; reduces voids in the grout; and increases grout density thereby increasing thermal conductivity of the grout. This also reduces the time required for a grouting operation. The use of the casing string 24 reduces the risk of collapse of the wellbore 34 during drilling, during grouting, and during casing extraction.

Figure 7:
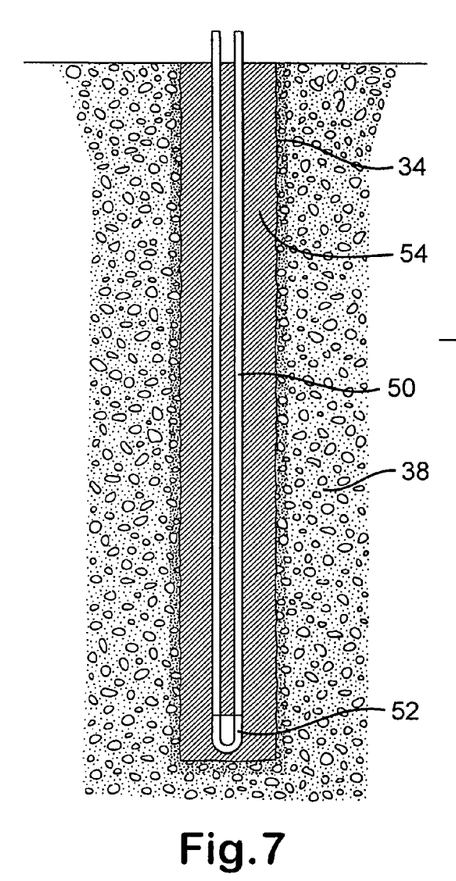
FIG. 7 is a schematic cross-section view showing steps in methods according to the present invention.

Upon extraction of all of the casing string 24, as shown in FIG. 7, and drilling apparatus 40, grout 54 encases the earth loop 50 and fills the wellbore 34.

Figure 8:
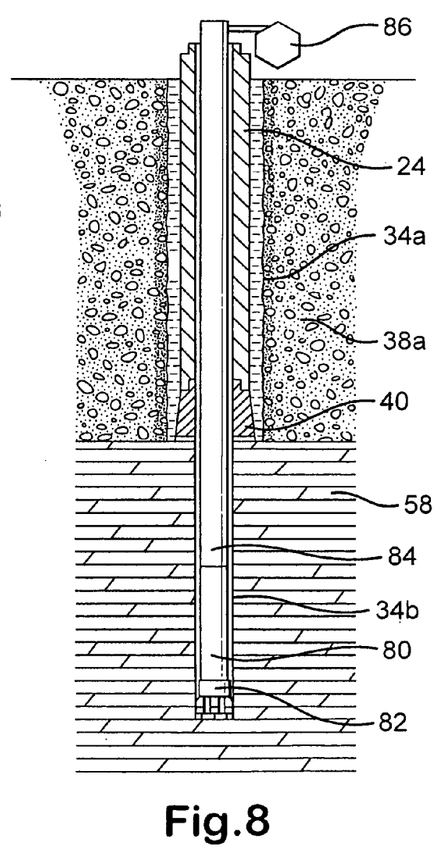
FIG. 8 is a schematic cross-section view showing steps in methods according to the present invention.

FIG. 8 illustrates one aspect of the present invention in which a wellbore 34a (like the wellbore 34) is drilled in a formation which may produce a wellbore that is prone to collapse, e.g. a formation 38a which is a soft overburden. The wellbore 34a is drilled like the wellbore 34 described above. When the drilling apparatus 40 reaches the top of a harder and/or more consolidated formation 58 (e.g. a formation of rock, limestone, granite, or sandstone) another type of drilling apparatus 80 is inserted down the interior of the casing string 24 and through the drilling apparatus 40 to continue drilling in the formation 58. The drilling apparatus 80 may be any known suitable solid bit apparatus and/or sacrificial and/or collapsible and/or retrievable bit apparatus. In one particular aspect the drilling apparatus 80 is a downhole air hammer drilling apparatus with a downhole hammer bit apparatus 82 on a drilling string 84 through which compressed air is pumped by a system 86 for operation of the apparatus 82. The drilling apparatus 80 produces an extension 34b of the wellbore 34a.

Figure 9:
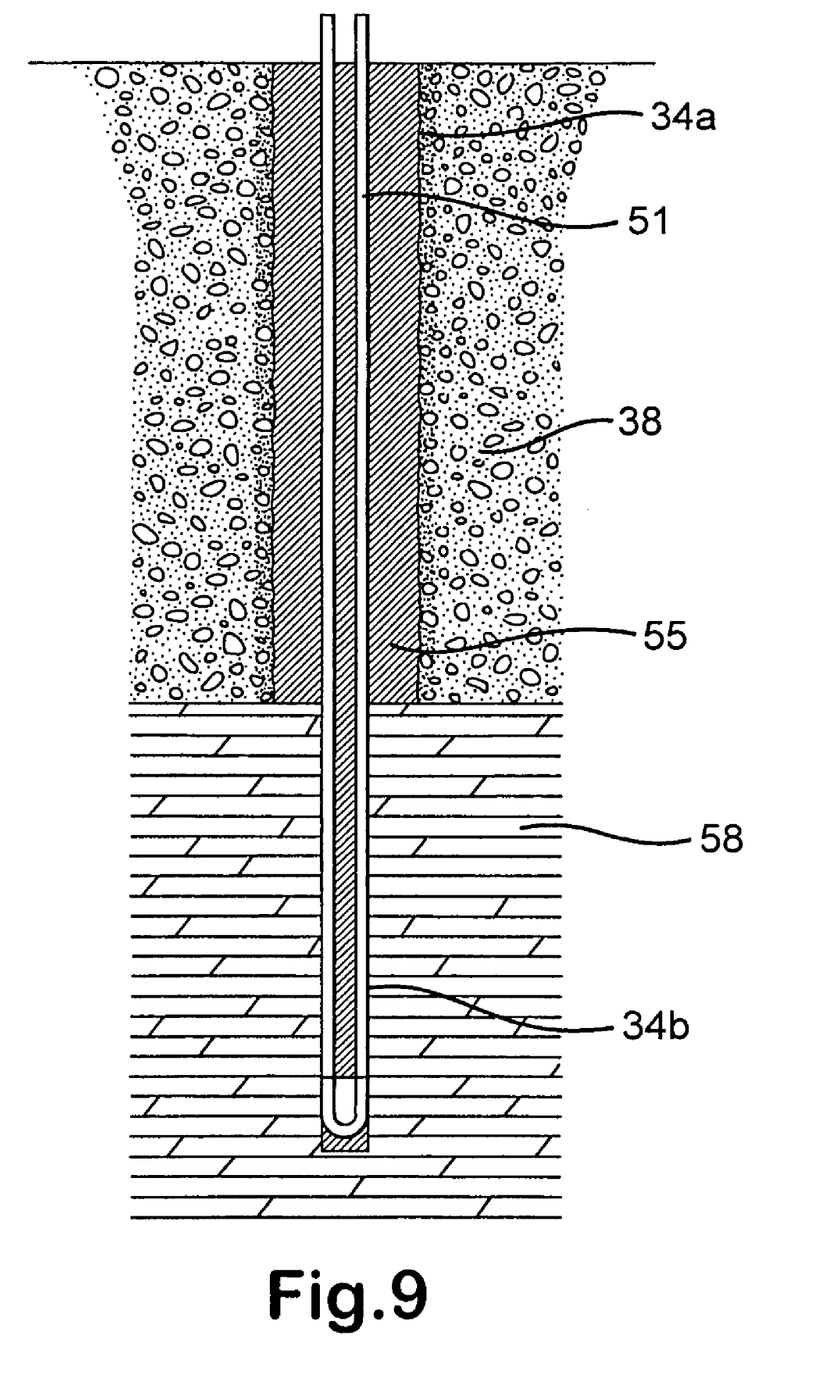
FIG. 9 is a schematic cross-section view showing steps in methods according to the present invention.

As shown in FIG. 9 an earth loop 51 (like the earth loop 50 described above) has been installed in the wellbore 34a, 34b and has been grouted in place with grout 55 (like the grout 54 described above).

The present invention, therefore, provides in some, but not necessarily all, embodiments a method for installing a heat exchange loop in a borehole, the method including drilling a borehole from an earth surface down into earth using sonic apparatus with a sonic drill head, the sonic drill head having casing (or other drill tubulars) connected thereto, drill apparatus connected to a lower end of the casing so that movement of the casing by the sonic drill head drills the borehole down into the earth, the casing having an interior, pumping drilling fluid down into the casing during drilling, down through the casing and out through the drilling apparatus, and upwardly in an annular space between an interior surface of the borehole and an exterior surface of the casing so that drilled material flows upward through the annular space in the borehole preventing drilled material from flowing up into the casing's interior, lowering a heat exchange loop down into the casing, introducing grout into the casing around the loop, the grout displacing an amount of the mixture of drilling fluid from within the casing, and extracting the casing from the borehole. Such a method may include one or some (in any possible combination) of the following: introducing grout into the casing as the casing is extracted from the borehole; introducing grout into the borehole around the loop after the casing has been extracted from the borehole; oscillating the casing with the sonic apparatus as the casing is extracted from the borehole; wherein the oscillating of the casing accomplishes at least one function from the group consisting of facilitation of casing extraction, inhibiting grout bridging, de-aerating the grout, increasing density of the grout (thereby increasing thermal conductivity), oscillation of drilled material, and reduction of friction between the casing and the grout; oscillating the casing as grout is introduced into the casing; adding drilling fluid additive (including any suitable know additive) to the drilling fluid during drilling; wherein the borehole is at least 300 feet deep, the borehole is drilled, the heat exchange pipe loop is lowered, the grout is introduced, and the casing is extracted within one hour; introducing water into the loop to inhibit its collapse; wherein the loop is substantially filled with water and is sealed following filling with water; wherein the water is pumped at a pressure of about 100 p.s.i.; wherein the grout is introduced into the casing by pumping the grout into the casing; wherein the grout is introduced into the casing by pouring the grout into the casing; wherein the grout includes set retardant material (e.g., but not limited to, a lignosulfate); wherein the heat exchange loop is made from material from the group consisting of polyethylene, steel, aluminum, aluminum alloy, zinc, zinc alloy, composite and fiberglass; wherein the sonic apparatus is on and is movable by a truck or crawler apparatus, the method including moving the sonic apparatus adjacent a location of the borehole; pumping a volume of drilling fluid into the casing that is greater than a volume of drilled material; wherein the casing is a string of interconnected pieces of casing and pieces of casing as needed are added to the string as drilling progresses; wherein the casing has an outer diameter and the drill apparatus has an outer diameter (and is, e.g., a bit or drillshoe) within 110% of the outer diameter of the casing; wherein the drilling produces drilled material and substantially all of the drilled material does not exit from the borehole at the earth surface; removing the drill apparatus from the lower end of the casing, inserting a secondary drilling apparatus through the casing, and drilling an extension of the borehole with the secondary drilling apparatus; and/or wherein the secondary drilling apparatus is from the group of: a coil tubing drilling system; a compressed air drilling system; and a downhole motor drilling system.

The present invention, therefore, provides in some, but not necessarily all, embodiments a method for compacting grout in a borehole, the method including oscillating a tubular apparatus in the grout; and, in one aspect, wherein the tubular apparatus is a string of casing.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. § 102 and satisfies the conditions for patentability in § 102. The invention claimed herein is not obvious in accordance with 35 U.S.C. § 103 and satisfies the conditions for patentability in § 103. This specification and the claims that follow are in accordance with all of the requirements of 35 U.S.C. § 112. The inventor may rely on the Doctrine of Equivalents to determine and assess the scope of their invention and of the claims that follow as they may pertain to apparatus not materially departing from, but outside of, the literal scope of the invention as set forth in the following claims. Any patent or patent application referred to herein is incorporated fully herein for all purposes.

What is claimed is:

1. A method for installing a heat exchange pipe loop in a borehole, the method comprising drilling a borehole from an earth surface down into earth using sonic apparatus with a sonic drill head, the sonic drill head having casing connected thereto, drill apparatus connected to a lower end of the casing so that movement of the casing by the sonic drill head drills the borehole down into the earth, the casing having an interior, pumping fluid down into the casing during drilling, down through the casing and out through the drilling apparatus, and upwardly in an annular space between an interior surface of the borehole and an exterior surface of the casing so that drilled material flows upward with the fluid through the annular space in the borehole preventing drilled material from flowing up into the casing's interior, lowering a heat exchange pipe loop down into the casing, the heat exchange pipe loop having a lowermost U-bend member, introducing grout into the casing around the heat exchange pipe loop, the grout displacing an amount of fluid from within the casing, and extracting the casing from the borehole.

2. The method of claim 1 further comprising oscillating the casing with the sonic apparatus as the casing is extracted from the borehole.

3. The method of claim 2 wherein the oscillating of the casing accomplishes at least one function from the group consisting of: facilitation of casing extraction; inhibiting grout bridging; de-aerating the grout; increasing density of the grout; oscillation of drilled material; and reduction of friction between the casing and the grout.

4. The method of claim 1 further comprising
oscillating the casing as grout is introduced into the casing.

5. The method of claim 1 wherein the fluid includes water and drilling fluid.

6. The method of claim 1 wherein the fluid includes water and drilling additives.

7. The method of claim 1 wherein the fluid includes water and drilling gel.

8. The method of claim 1 further comprising
adding drilling fluid additive to the fluid during drilling.

9. The method of claim 1 wherein the borehole is at least 300 feet deep; the borehole is drilled, the heat exchange pipe loop is lowered, the grout is introduced, and the casing is extracted within one hour.

10. The method of claim 1 further comprising
introducing water into the heat exchange pipe loop to inhibit collapse of the heat exchange pipe loop.

11. The method of claim 10 wherein the heat exchange pipe loop is substantially filled with water and is sealed following filling with water.

12. The method of claim 1 wherein the heat exchange pipe loop is made from material from the group consisting of polyethylene, steel, aluminum, aluminum alloy, zinc, zinc alloy, composite and fiberglass.

13. The method of claim 1 further comprising
removing the drill apparatus from the lower end of the casing,
inserting a secondary drilling apparatus through the casing, and
drilling an extension of the borehole with the secondary drilling apparatus.

14. The method of claim 13 wherein the secondary drilling apparatus is from the group consisting of: a coil tubing drilling system; a compressed air drilling system; and a downhole motor drilling system.

15. The method of claim 13 wherein the secondary drilling apparatus includes bit apparatus from the group consisting of solid bit, sacrificial bit, collapsible bit, and retrievable bit.

16. The method of claim 1 wherein the drilling apparatus includes apparatus from the group consisting of drill shoe, open drilling shoe, casing shoe, fullface drill bit with at least one hole therethrough for fluid flow.

17. A method for installing a heat exchange pipe loop in a borehole, the method comprising
drilling a borehole from an earth surface down into earth using sonic apparatus with a sonic drill head, the sonic drill head having casing connected thereto, drill apparatus connected to a lower end of the casing so that movement of the casing by the sonic drill head drills the borehole down into the earth, the casing having an interior,
pumping fluid down into the casing during drilling, down through the casing and out through the drilling apparatus, and upwardly in an annular space between an interior surface of the borehole and an exterior surface of the casing so that drilled material flows upward with the fluid through the annular space in the borehole preventing drilled material from flowing up into the casing's interior,
lowering a heat exchange pipe loop down into the casing,
introducing grout into the casing around the heat exchange pipe loop, the grout displacing an amount of fluid from within the casing,
extracting the casing from the borehole,
oscillating the casing with the sonic apparatus as the casing is extracted from the borehole, and
oscillating the casing as grout is introduced into the casing.

18. A method for installing a heat exchange pipe loop in a borehole, the method comprising
drilling a borehole from an earth surface down into earth using sonic apparatus with a sonic drill head, the sonic drill head having casing connected thereto, drill apparatus connected to a lower end of the casing so that movement of the casing by the sonic drill head drills the borehole down into the earth, the casing having an interior,
the drill apparatus including apparatus from the group consisting of drill shoe, open drilling shoe, casing shoe, fullface drill bit with at least one hole therethrough for fluid flow,
pumping fluid down into the casing during drilling, down through the casing and out through the drilling apparatus, and upwardly in an annular space between an interior surface of the borehole and an exterior surface of the casing so that drilled material flows upward with the fluid through the annular space in the borehole preventing drilled material from flowing up into the casing's interior,
lowering a heat exchange pipe loop down into the casing,
introducing grout into the casing around the heat exchange pipe loop, the grout displacing an amount of the mixture of drilling fluid from within the casing, and
extracting the casing from the borehole.

19. A method for installing a heat exchange pipe loop in a borehole, the method comprising
drilling a borehole from an earth surface down into earth using sonic apparatus with a sonic drill head, the sonic drill head having casing connected thereto, drill apparatus connected to a lower end of the casing so that movement of the casing by the sonic drill head drills the borehole down into the earth, the casing having an interior,
pumping fluid down into the casing during drilling, down through the casing and out through the drilling apparatus, and upwardly in an annular space between an interior surface of the borehole and an exterior surface of the casing so that drilled material flows upward with the fluid through the annular space in the borehole preventing drilled material from flowing up into the casing's interior,
lowering a heat exchange pipe loop down into the casing,
introducing grout into the casing around the heat exchange pipe loop, the grout displacing an amount of the mixture of drilling fluid from within the casing,
extracting the casing from the borehole,
removing the drill apparatus from the lower end of the casing,
inserting a secondary drilling apparatus through the casing, the secondary drilling apparatus including bit apparatus from the group consisting of solid bit, sacrificial bit, collapsible bit, and retrievable bit, and
drilling an extension of the borehole with the secondary drilling apparatus.

20. A method for installing a heat exchange pipe loop in a borehole, the method comprising
drilling a borehole from an earth surface down into earth using sonic apparatus with a sonic drill head, the sonic drill head having casing connected thereto, drill apparatus connected to a lower end of the casing so that movement of the casing by the sonic drill head drills the borehole down into the earth, the casing having an interior,
pumping fluid down into the casing during drilling, down through the casing and out through the drilling apparatus, and upwardly in an annular space between an interior surface of the borehole and an exterior surface of the casing so that drilled material flows upward with the fluid through the annular space in the borehole preventing drilled material from flowing up into the casing's interior,
lowering a heat exchange pipe loop down into the casing, introducing grout into the casing around the heat exchange pipe loop, the grout displacing an amount of the mixture of drilling fluid from within the casing, and extracting the casing from the borehole.

21. The method of claim 20 wherein the fluid includes water and drilling fluid.

22. The method of claim 20 wherein the fluid includes water and drilling additives.

23. The method of claim 20 wherein the fluid includes water and drilling gel.

* * * * *

UNITED STATES PATENT AND TRADEMARK OFFICE
CERTIFICATE OF CORRECTION

PATENT NO. : 7,093,657 B2
APPLICATION NO. : 11/247997
DATED : August 22, 2006
INVENTOR(S) : Howard E. Johnson, Jr. et al.

It is certified that error appears in the above-identified patent and that said Letters Patent is hereby corrected as shown below:

Title Page, Item (75) Inventors, should read --Howard E. Johnson, Jr., Kennesaw, GA (US); Raymond J. Roussy, Surrey (CA)--.

Signed and Sealed this

Eighteenth Day of May, 2010

David J. Kappos
*Director of the United States Patent and Trademark Office*